United States Patent Office 3,433,582
Patented Mar. 18, 1969

3,433,582
PROCESS FOR PRODUCING HYDROGEN PEROXIDE AND AN ALKALI METAL PERBORATE
John Stewart Campbell, Norton-on-Tees, England, assignor to Imperial Chemical Industries Limited, London, England, a corporation of Great Britain
No Drawing. Filed July 2, 1964, Ser. No. 380,051
Claims priority, application Great Britain, July 23, 1963, 29,127/63
U.S. Cl. 23—60                         17 Claims
Int. Cl. C01b 15/12, 15/02

ABSTRACT OF THE DISCLOSURE

A process for production of hydrogen peroxide is disclosed, wherein hydrogen and oxygen are contacted with a solid catalyst in a liquid medium containing water and dissolved boric acid. An alkali metal perborate may be produced by adding alkali metal borate, boric acid and alkaline compound of alkali metal to the hydrogen peroxide solution to convert the peroxide to the perborate.

This invention relates to a chemical process, especially for producing hydrogen peroxide and peroxy-salts especially perborates.

In co-pending U.S. Patent No. 3,361,533 there is described a process for producing hydrogen peroxide which comprises contacting hydrogen and oxygen with a solid catalyst in the liquid phase in the presence of water, an acid and a non-acidic oxygen containing organic compound; and it is stated that the acid used is preferably at least as strong as acetic acid. We have now found surprisingly that hydrogen and oxygen will combine together to give hydrogen peroxide in good yields if contacted with a solid catalyst in a liquid medium containing boric acid, although boric acid in aqueous solution is much weaker than acetic acid.

According to the invention there is provided a process of producing hydrogen peroxide which comprises contacting hydrogen and oxygen with a solid catalyst in a liquid medium containing water and dissolved boric acid.

The concentration of boric acid is preferably at least 0.1 N. It may be lower; and may be considerably higher, for example 2 N or saturation concentration without serious detriment to the yield of hydrogen peroxide. If the hydrogen peroxide solution is to be used for making perborates, the boric acid equivalent to the hydrogen peroxide to be produced may be all added at the start. Alternatively the production of hydrogen peroxide may be effected in the presence of a small quantity of boric acid and the remainder of the necessary boric acid added later, as such or as a borate for example borax, along with any further alkali needed for the formation of the perborate.

Preferably one or more other acids stronger than boric acid are present in addition to the boric acid. The other acid or acids are preferably at least as strong as acetic acid and may in general be as defined in co-pending U.S. Patent No. 3,361,533. They may conveniently be one or more boric acid derivatives of polyhydric alcohols. The concentration of the other acid or acids is preferably kept low, that is, below 1 N. This is so especially when a perborate is the final product of the process and it is desired to make the perborate substantially free of contamination by other salts.

The acid used (other than boric acid) preferably has an inorganic acidic radical. Conveniently sulphuric or hydrochloric acid is used but others for example nitric acid, hydrofluoric acid, hydrobromic acid, phosphoric (that is orthophosphoric) acid or sulphonic acids may be used.

There may also be present a second radical of the type defined in co-pending U.S. Patent No. 3,361,533, that is, sulphate, nitrate, fluoride, chloride, bromide, cyanide, cyanate, thio-cyanate or phosphate, especially a halogen or pseudo-halogen from that list. The concentration of the second acid radical is especially in the range $10^{-4}$ N to 0.1 N, but like the concentration of the acid is preferably kept low if a pure perborate is to be the final product of the process. The second acid radical may be added in the acid form or as a salt.

The second acid radical is very suitably chloride. Hence it is very convenient to carry out the process in the presence of only hydrochloric acid in addition to boric acid: the hydrochloric acid then supplies both the acid and the second acid radical.

The process of the invention is preferably carried out in the presence of a hydrogen peroxide stabiliser as defined in co-pending U.S. Patent No. 3,336,112. The stabiliser used is preferably added to the reaction system as a salt of condensed phosphoric acid, for example having a polymerisation number up to about 14, especially of pyrophosphoric or hexametaphosphoric acid. Thus conveniently there may be used sodium pyrophosphate or e.g. sodium hexametaphosphate; the latter may be used as the product sold under the Registered Trade Mark "Calgon." If a pure perborate is to be the final product of the process it may be preferred to pre-treat the reaction vessel with the stabiliser and thereafter to carry out the reaction without further added stabiliser. On the other hand if the perborate is to be a constituent of a detergent composition and the stabiliser is of a kind (for example a pyrophosphate or polyphosphate) which is also a constituent of a detergent composition, then the presence of such a hydrogen peroxide stabiliser in the product will not matter.

The process of the invention is preferably carried out in the presence of an oxygen-containing organic compound, for example, an alcohol, aldehyde, ketone, ether, ester, amide, oxygen-containing amine or carboxylic acid. It is preferred to use one or more alcohols or ketones having a solubility in water of at least 1% by volume at room temperature and especially to have present at least some oxygen-containing organic compound of a kind which is miscible with water at room temperature so that a one-phase mixture results. Acetone is highly effective and suitably forms by volume 30%–95% especially 40%–90%, for example 75%, of the liquid of the reaction mixture.

The solid catalysts to be used preferably contain as metallic component at least one element from Group I or Group VIII of the Periodic Table, as described in the co-pending U.S. Patent No. 3,361,533. Palladium is especially effective and is preferably introduced on a support as described in the co-pending U.S. Patent No. 3,361,533 or as a palladium salt of an isopoly or heteropoly acid. A particularly suitable catalyst consists essentially of palladium supported on silica gel, especially 1% to 10% by weight of palladium supported on silica gel having a specific surface of 200 to 400 m.²/g. The catalyst is used conveniently in the form of a finely divided solid maintained in suspension in the liquid reaction mixture, but other forms, such as pellets, over which the liquid is caused to flow, may be used.

In general the conditions under which the process is carried out may be the same as those described in the above-mentioned co-pending U.S. Patent No. 3,361,533. Thus the hydrogen and oxygen may be used in dilution with unreactive gas if desired, for example, oxygen may be supplied as air. When operating the process it is preferable to avoid contact between hydrogen-oxygen mixtures and dry catalyst. The pressure and temperature at which the process is operated may vary over a wide range. Conveniently the process may be operated at atmospheric pressure (that is 1 part hydrogen to 5 parts air, giving a partial pressure of 0.16 atmosphere of each gas), but hydrogen peroxide is produced at a higher concentration at superatmospheric pressures for example 3 atmospheres each of hydrogen and oxygen in admixture with 69 atmospheres of nitrogen as a diluent. Still higher pressures for example 50 atmospheres each of hydrogen and oxygen may be used if desired. Conveniently the process is operated at room temperature (say 20° C.), but hydrogen peroxide is produced in higher concentration when a lower temperature (for example in the range 0° C. to −20° C. or below) is employed.

As a result of the mild temperature conditions the process may be carried out in vessels made of or lined with a considerable variety of material, for example, glass, especially low alkali borosilicate glass such as "Pyrex" (Registered trademark), plastics especially polypropylene, nylon, polytetrafluoroethylene and poly-ethyleneterephalate, as well as the metals which would normally be considered for the reaction mixture used.

The solution of hydrogen peroxide produced by the process of the invention may be used for an oxidation process for example the oxidation of cyclohexane to cyclohexanol and cyclohexanone or of benzene to phenol or the hydroxylation of olefines. Such processes are described in our co-pending U.S. Patent No. 3,361,553. Alternatively it may be worked up by separating the solid catalyst and evaporating the resulting solution. This may be carried out without added reactants, for example as such to give high concentration hydrogen peroxide or may be carried out in the presence of peroxide-forming substances for example urea or a borate for example sodium borate or a carbonate for example sodium carbonate.

The invention provides thus a very simple process for making perborates from inexpensive starting materials.

The process may be conducted as a batch-wise or a continuous process. Conveniently the continuous form of the process is conducted in one or more catalyst-packed towers.

The invention is illustrated by the following examples.

Example 1

A "Pyrex" (Registered trademark) reaction vessel was rinsed with a saturated aqueous solution of sodium pyrophosphate and then allowed to drain. Then there were placed in it 60 ml. of a solution of boric acid (N) and hydrochloric acid ($10^{-2}$ N) in a mixture of acetone 75% and water 25% (by volume) and 1 g. of finely divided palladium (5%) on silica gel was added to this solution. The mixture was stirred vigorously at 0° C. for 105 minutes during which time a mixture of hydrogen (1 part) and air (4 parts) at atmospheric pressure was passed in at a rate of 25 liters per hour. In this time 1.04 g. of hydrogen peroxide were produced in the reaction mixture. The palladium catalyst was removed by filtration. The acetone was removed by evaporation in vacuo at room temperature. In the resulting aqueous solution there were dissolved 0.7 g. of boric acid, then 1.3 g. of sodium hydroxide. After 30 minutes' standing at 0° C. a precipitate of a sodium perborate hydrate (3.7 g.) had been formed. This product was substantially free of sodium chloride.

Example 2

The process of Example 1 was repeated but without the pyrophosphate pre-treatment of the reaction vessel. In 240 minutes' operation, during which time the mixture of hydrogen and air was passed in at the rate of 30 liters per hour, 0.8 g. of hydrogen peroxide was produced in the reaction mixture. In a comparison run in which sulphuric acid was used instead of boric acid, only 0.5 g. of hydrogen peroxide was present at the end of the reaction.

Example 3

A solution (20 ml.) of boric acid (N) and hydrochloric acid ($10^{-2}$ N) in a mixture of acetone 75% and water 25% (by volume) and having suspended in it 0.2 g. of a finely divided catalyst (silica gel supporting 5% by weight of palladium) was stirred vigorously in a glass-lined autoclave. Hydrogen and oxygen were pumped in to give a pressure of 50 atmospheres of each and stirring was continued for 30 minutes. After this time the pressure had fallen to 92 atmospheres. The solution then contained 0.52 g. of hydrogen peroxide.

I claim:

1. A process of producing hydrogen peroxide which comprises contacting hydrogen and oxygen with a solid catalyst containing at least one element of Group I or Group VIII of the Periodic Table in a liquid medium containing water and dissolved boric acid wherein the concentration of the boric acid is at least 0.1 N.

2. A process according to claim 1 wherein at least one other acid at least as strong as acetic acid is also present.

3. A process according to claim 2 wherein the concentration of the said other acid is less than 1 N.

4. A process according to claim 1 wherein there is present a compound giving rise to ions selected from the class consisting of halogen ions and pseudo-halogen ions.

5. A process according to claim 4 wherein there is present an acid radical selected from the group consisting of sulphate, nitrate, fluoride, chloride, bromide, cyanide, cyanate, thio-cyanate and phosphate.

6. A process according to claim 5 wherein chloride is present.

7. A process according to claim 5 wherein the concentration of the said acid radical is in the range $10^{-4}$ N to 0.1 N.

8. A process according to claim 1 wherein a stabilizing and activating salt of a condensed phosphoric acid having a polymerization No. up to about 14 is present.

9. The process as claimed in claim 8 wherein said salt is sodium salt.

10. A process according to claim 1 wherein there is present at least one compound selected from the class consisting of alcohols and ketones having a solubility in water of at least 1% by volume at room temperature.

11. A process according to claim 10 wherein acetone is present.

12. A process according to claim 11 wherein acetone forms 30% to 95% of the liquid of the reaction mixture.

13. A process according to claim 1 wherein the catalyst is palladium.

14. A process according to claim 13 wherein the catalyst consists essentially of palladium supported on silica gel.

15. A process according to claim 14 wherein the catalyst consists of 1% to 10% by weight of palladium supported on silica gel having a specific surface of 200 to 400 m.²/g.

16. A process according to claim 8 wherein the condensed phosphoric acid has a polymerisation number of from 2 to 14.

17. A process for producing an alkali metal perborate which comprises producing a solution of hydrogen peroxide by contacting hydrogen and oxygen with a solid catalyst containing at least one element of Group I or Group VIII of the Periodic Table in a liquid medium containing water and dissolved boric acid wherein the concentration of the boric acid is at least 0.1 N, adding sufficient alkali metal borate, boric acid and alkaline compound of an alkali metal to react with substantially all the hydrogen peroxide present to convert the same to perborate, and separating the perborate.

References Cited

UNITED STATES PATENTS

| | | | |
|---|---|---|---|
| 1,108,752 | 8/1914 | Henkel et al. | 23—207 |
| 1,758,920 | 5/1930 | Baum | 23—207.5 X |
| 2,368,640 | 2/1945 | Cook | 23—207 |
| 2,491,789 | 12/1949 | Young | 23—60 X |

FOREIGN PATENTS

| | | |
|---|---|---|
| 23,676 of 1908 | 12/1909 | Great Britain. |
| 8,582 of 1913 | 6/1913 | Great Britain. |
| 859,219 | 1/1961 | Great Britain. |

OTHER REFERENCES

Bretschger et al.: "The Electrochemical Society," Preprint 92–36, 1947, pp. 67 to 75, 23–207.

OSCAR R. VERTIZ, *Primary Examiner.*

H. T. CARTER, *Assistant Examiner.*

U.S. Cl. X.R.

23—207, 207.5